INVENTORS:
JOSEPH A. VICTOR,
DAVID M. WILLYOUNG,
BY *W. C. Cutcher*
HIS ATTORNEY.

INVENTORS:
JOSEPH A. VICTOR,
DAVID M. WILLYOUNG,

THEIR ATTORNEY.

April 7, 1970     J. A. VICTOR ET AL     3,505,546
GAS COOLED DYNAMOELECTRIC MACHINE WITH CAGE TYPE STATOR FRAME
Filed Oct. 14, 1968     4 Sheets-Sheet 4

INVENTORS:
JOSEPH A. VICTOR,
DAVID M. WILLYOUNG,
BY *W. C. Crutcher*
THEIR ATTORNEY.

United States Patent Office 3,505,546
Patented Apr. 7, 1970

3,505,546
GAS COOLED DYNAMOELECTRIC MACHINE WITH CAGE TYPE STATOR FRAME
Joseph A. Victor and David M. Willyoung, Scotia, N.Y., assignors to General Electric Company, a corporation of New York
Filed Oct. 14, 1968, Ser. No. 767,434
Int. Cl. H02k 9/08
U.S. Cl. 310—55                         7 Claims

ABSTRACT OF THE DISCLOSURE

A cage type hydrogen cooled generator with radial flow of cooling gas to and from the air gap through alternating inlet and outlet zones in the core. The cage or inner frame, which supports the core, is supplied with cold gas from longitudinal cooling manifolds extending along the top and bottom of the machine in the outer frame. The hot gas flowing from the air gap is similarly discharged to longitudinal manifolds extending along the sides of the machine in the outer frame. The interface between outer and inner frames is accomplished with longitudinal gas seals.

BACKGROUND OF THE INVENTION

Figure 1:
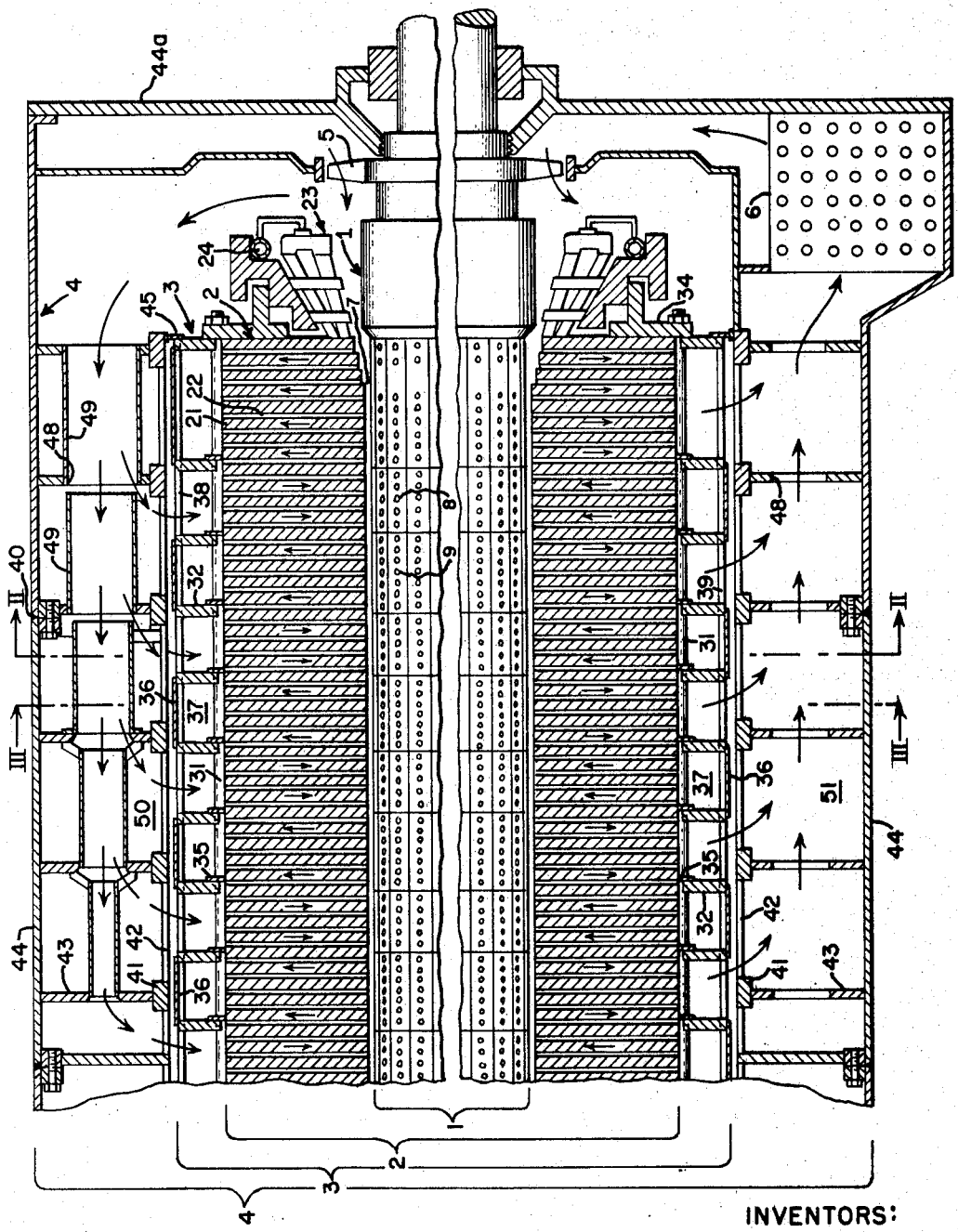

The present invention relates to very large dynamoelectric machines, such as hydrogen and liquid cooled turbine-generators on the order of 800 MVA or more. One of the main design problems with such large machines is to be able to build them of the required rating without exceeding the weight and size which can be transported to the final location. One expedient has been to employ the so-called "cage" construction involving an inner frame holding the magnetic core laminations and windings in place which is shipped as one unit and an "outer frame" which may be shipped in sections and incorporating the necessary gas supply passages and supporting structure for the inner frame. Examples of such cage constructions are seen in U.S. Patents 1,689,503 issued to M. A. Savage on Oct. 30, 1928 and 2,554,226 issued to H. D. Taylor on May 22, 1951.

Another means to reduce the size of the components in dynamoelectric machines has been to reduce the outer frame diameter by removing the holes in the section plates which are provided for passage of cooling gas and instead employing external domes or "blisters" for carrying the gas longitudinally. These latter members, sometimes also containing the gas coolers, are shipped as separate units for field assembly. Such a construction is illustrated in U.S. Patent 2,650,994 issued to J. J. Bahn on Sept. 1, 1953.

In the event that a single frame construction cannot be employed and it is necessary to use a cage construction, one disadvantage in the past has been the interdependence between the outer frame and the inner frame (or cage) in terms of the gas flow at the peripheral interface between frames. Gas flow zones in the inner frame were usually matched up with an equal number of similar zones in the outer frame and suitable sealing accomplished between frames using circumferential baffles. In other words, the number of radial section plates in the outer frame depended upon the number of radial section plates in the inner frame which, in turn, depended upon the number of axially spaced inlet and outlet gap pickup zones along the air gap. It is undesirable for economic and manufacturing reasons to have too many short sections in the outer frame, whereas efficient cooling of the stator core and rotor dictate relatively short sections providing multiple parallel cooling paths in the inner frame.

Accordingly, one object of the present invention is to provide an improved stator assembly for a gas cooled cage type dynamoelectric machine.

Another object of the invention is to provide a gas cooled dynamoelectric machine with radial flow cooling of the core, wherein the number of cooling sections in the inner frame supporting the core is not dependent on the number of cooling sections in the outer frame supporting the inner frame.

DRAWING

Figure 2:
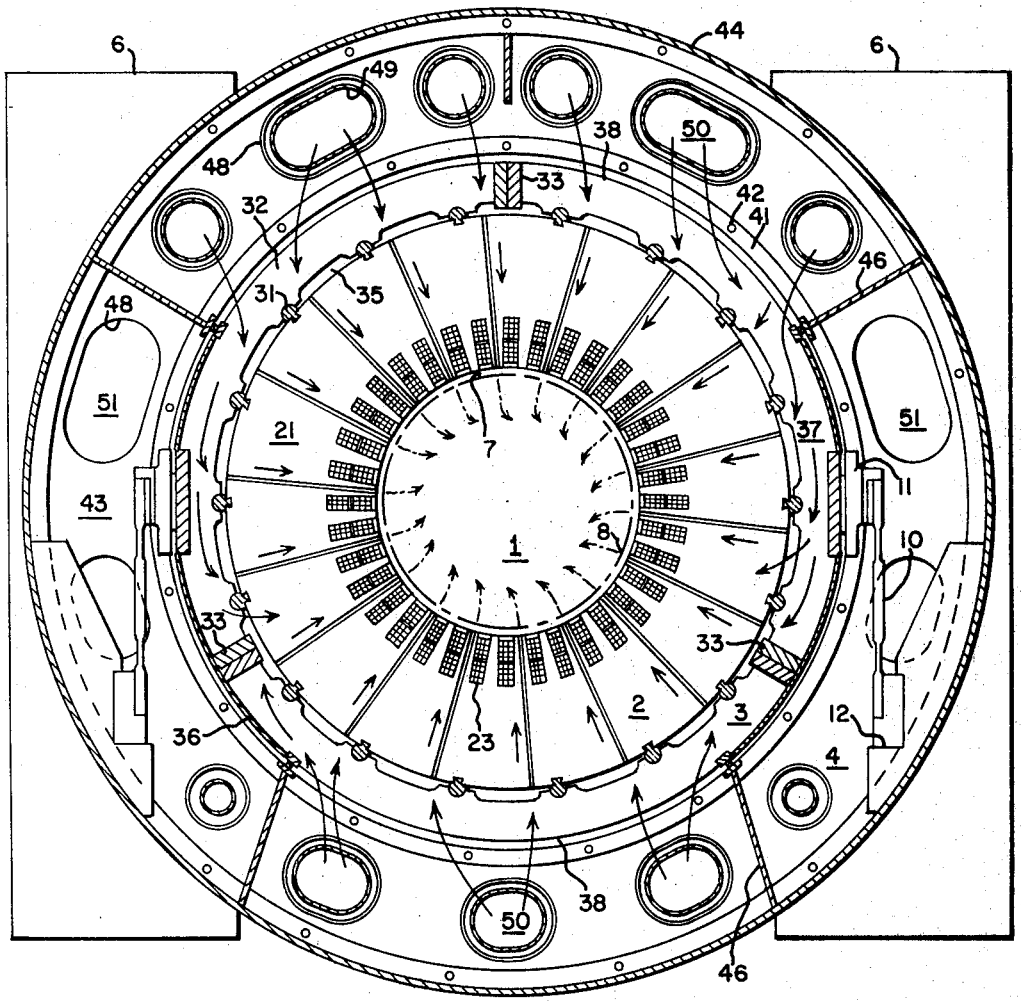
Figure 3:
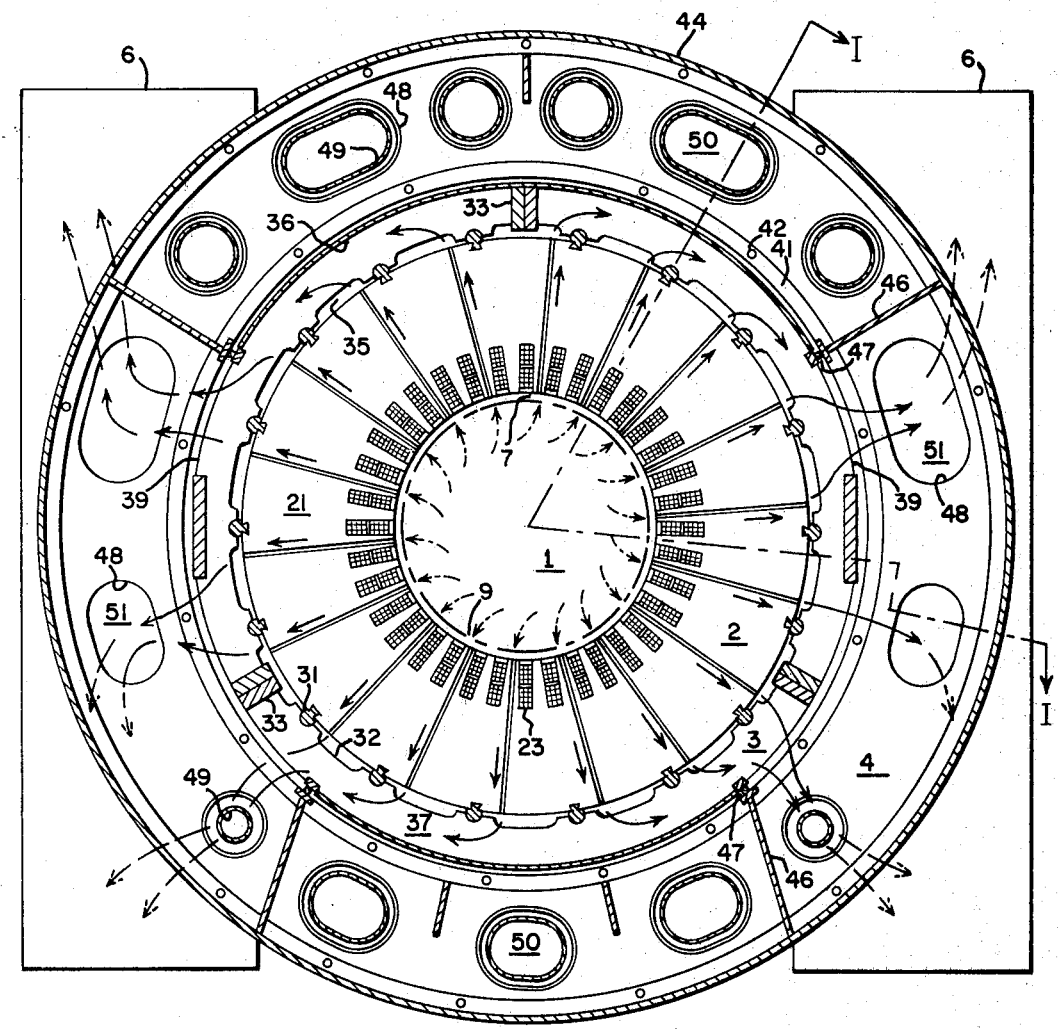
Figure 4:
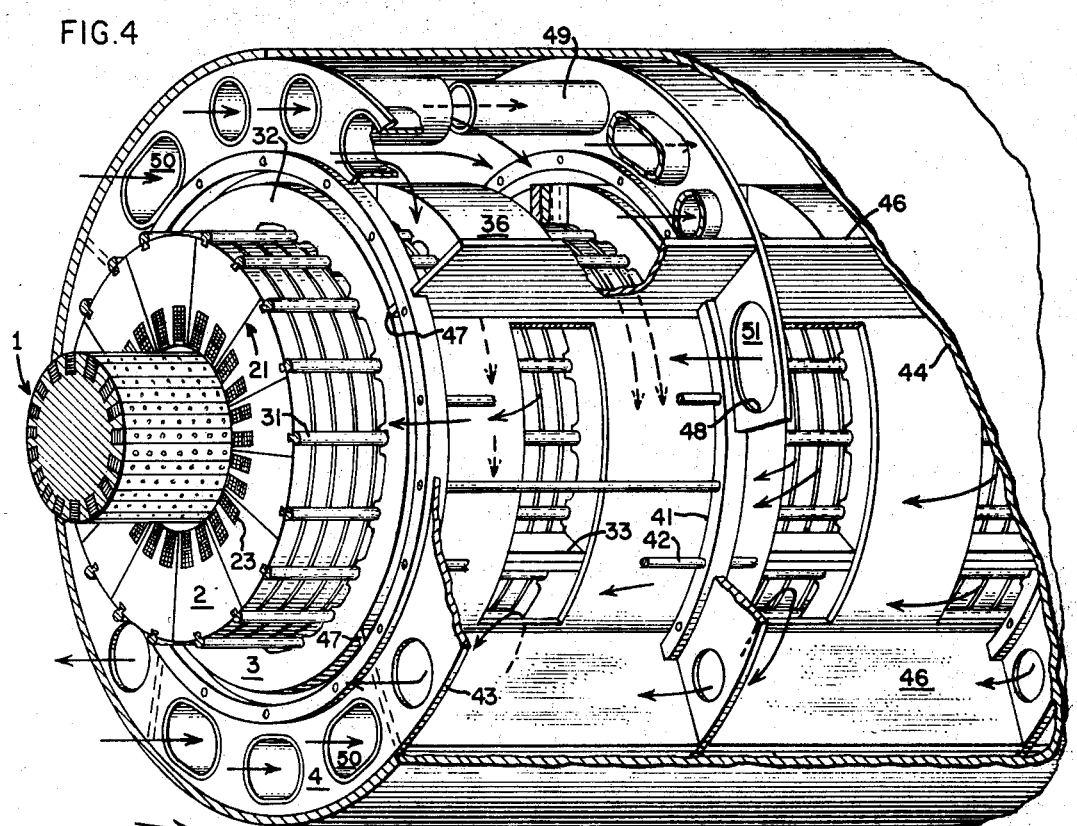
Figure 5:
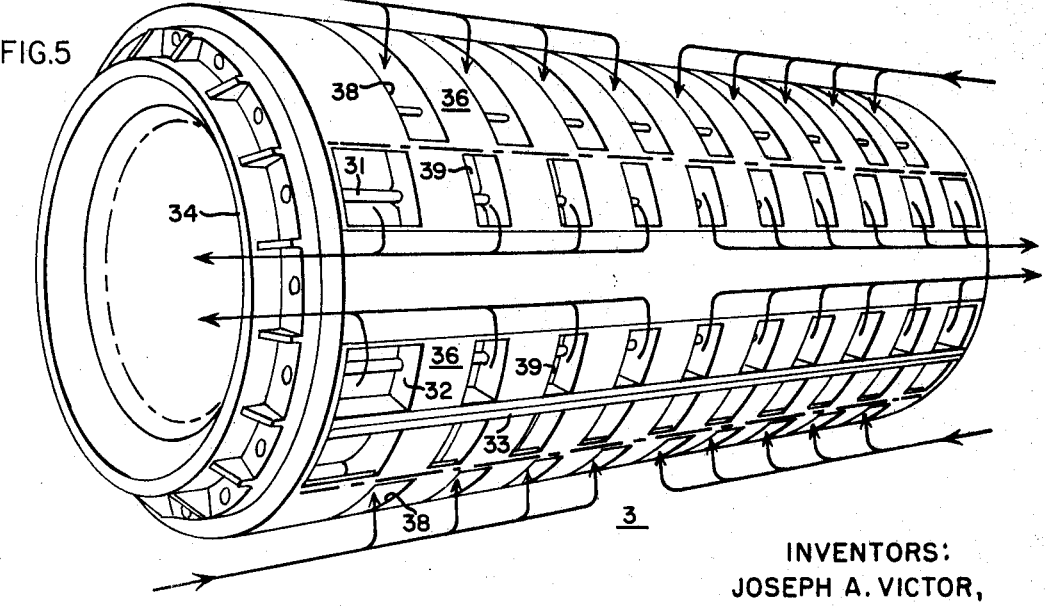

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing, in which:

FIG. 1 is a composite cross-sectional view of one-half of the length of the dynamoelectric machine, taken through angularly spaced locations along lines I—I of FIG. 3, FIG. 2 is a cross-sectional transverse view through a cold gas inlet section, taken along lines II—II of FIG. 1, FIG. 3 is a transverse cross-sectional view through a hot gas outlet section, along lines III—III of FIG. 1, FIG. 4 is a perspective cutaway drawing showing portions of the rotor, core, inner frame and outer frame, and FIG. 5 is a perspective view of the inner frame only, showing the pattern of gas flow.

SUMMARY OF THE INVENTION

Briefly stated, the invention is practiced by arranging an inner frame or cage supporting the magnetic core and having alternating hot and cold gas ducts communicating with radial passages in the core. The openings to the cold gas ducts are all disposed along one axial line and openings to the hot gas ducts are disposed along another axial line. The outer frame supports the inner frame and is provided with longitudinal hot and cold gas manifolds servicing the lines of openings to the inner cage ducts. Longitudinal members divide the outer frame hot and cold gas manifolds from one another around the stator and longitudinal seals bridge the gap between inner and outer frames at the interface.

DESCRIPTION OF THE PREFERRED EMBODIMENT

Referring now to FIG. 1 of the drawing, a dynamoelectric machine such as a large hydrogen cooled steam turbine-generator, has a rotor 1 disposed so as to rotate within the cylindrical bore of a laminated magnetic core structure 2. The core 2 is coaxially supported within a separate and structurally integral inner frame or "cage" 3. Cage 3, in turn, is supported coaxially within the bore of an outer frame 4.

As is usual with this type of machine, the casing is filled with a gaseous coolant such as hydrogen under pressure and is sealed against leakage to the atmosphere. Means to recirculate coolant gas through the machine and to cool the gas include an axial flow fan such as 5 disposed on either end of rotor 1 and vertical tube coolers 6 located at either side of the rotor centerline on both ends of the machine.

The rotor 1 carries field windings disposed in longitudinal slots arranged for the passage of cooling gas which is picked up from and discharged to the air gap 7. Gap pickup inlet holes 8 and outlet holes 9 are arranged in alternating zones along the rotor. The internal pattern of the rotor cooling may be of the diagonal flow type as described in U.S. Patent 2,986,664 issued to D. M. Willyoung and P. A. Becker on May 30, 1961.

The construction of the magnetic core 2 is of a known type, wherein stacks of laminations or punchings are grouped in packages of laminations 21 separated at intervals to define radial ducts 22. Thus the cooling gas flows radially inward and outward to and from the air gap 7 as indicated in FIG. 1. This gap passing through radial ducts 22 cools the magnetic core 2 and then cools the rotor windings. Main armature windings 23 are disposed in slots formed by the laminations 21, these windings being cooled by liquid from circular pipe headers 24.

The inner frame or cage 3 is made up of three arcuate segments fastened together to form a cylindrical framework holding the core laminations 21. Reference to FIG. 2 and FIG. 3 shows that a series of longitudinal rods or "tie-bars" 31 are secured in axially spaced radial plates 32. The opposite ends of plates 32 are secured to longitudinal joining plates 33 which are attached together to form a cylindrical cage. The reason for making the cage 3 in arcuate segments is so that by appropriate shimming or machining of the longitudinal joining plates 33, the cage can be made of the proper tightness to hold the laminations of core 2. As indicated in FIGS. 2 and 3, the laminations are held by a dovetail connection with the tie-bars 31. A circular flange ring 34 clamps the laminations tightly by means of threaded connections to the tie-bars.

To control the flow of cooling gas within the inner frame, circumferential seals or "core baffles" 35 are attached to the radial plates 32 and form close clearances with the periphery of the core. A series of circumferentially extending plates 36 partially enclose the radial plates 32. Plates 36, radial plates 32, and the periphery of core 2 together provide a series of circumferentially extending ducts 37 which communicate with the radial ducts 22 in the core and therefore with the air gap 7. Plates 36 are interrupted at intervals to provide inlet openings 38 to circumferential ducts 37 and, at other circumferentially spaced locations, to provide outlet openings 39 from circumferential ducts 37.

It is important to note that inlet openings 38 are disposed in two axially extending lines along the top and bottom of the cage, whereas outlets 39 are disposed in two axially extending lines along the opposite sides of the cage, although the positions could be reversed. FIG. 5 illustrates the location of openings 38, 39 along the entire cage, as well as the cage construction itself.

The inner frame 3 is supported within the outer frame 4 by a series of spring mounting columns 10 attached at the upper end by bosses 11 to the inner frame and supported at the lower end by brackets 12 attached to the outer frame. The mounting springs 10 serve to isolate vibration between the inner and outer frames according to the philosophy of the aforementioned U.S. Patent 2,554,226 to H. D. Taylor.

The outer frame 4 is made up of cylindrical sections intended to be shipped separately and assembled around the inner frame at the site during final construction. The frame sections are designed to be bolted and welded together around the circumference as indicated at 40 in FIG. 1, but the outer frame 4 will be discussed as though it were a single member.

Outer frame 4 is made up of a series of rings 41 axially spaced along other tie rods 42. Extending radially outward from rings 41 are section plates 43. Rings 41 and plates 43 can be spaced at any desired location without regard to the radial plate spacing of previously mentioned inner frame radial plates 32. The section plates 43 are entirely enclosed by gas tight wrapper 44, which cooperates with end plates 44a to enclose the entire machine including coolers 6. A circumferential end seal 45 closes off the end space between frames 3 and 4.

Reference to FIGS. 2, 3 and 4 shows that the outer frame 4 is divided into four quadrants by longitudinal plates 46. Longitudinal seals 47 of flexible material such as rubber bridge the gap between frames to prevent leakage circumferentially through the annular space between the inner and outer frames. The axially spaced section plates 43 are provided with holes 48, and in some places, flow distributing pipes 49 are added to facilitate movement of the gas in a longitudinal direction through the outer frame.

By means of the outer wrapper 44, the longitudinal plates 46 and the outer surface of cage 3, four longitudinal manifolds are formed along the length of the machine. Two of these are cold gas supply manifolds 50 along the top and bottom of the machine, and two are hot gas or return manifolds 51 along opposite sides of the machine. Manifolds 50 extend along over the lines of axially spaced inlets 38 leading to the inner frame, while manifolds 51 extend over the line of axially spaced outlets 39 leading from the inner frame.

OPERATION OF THE INVENTION

The operation of the invention is as follows. Cool gas flowing from the coolers 6 at both ends of the machine toward the suction side of fan 5 is blown into the upper and lower manifolds 50 from the chambers at each end of the machine toward the center. As indicated in FIG. 1, the flow guiding pipes 49 act as flow dividers allowing a portion of the gas to flow inward and directing the rest of the gas into the next section. Reference to FIGS. 4 and 5 shows the gas flowing inwardly through the inlets 38 into the circumferentially extending ducts along alternate sections of the cage.

FIG. 2, which is a cross-section through the radial ducts 22 between lamination packages, shows how the circumferentially flowing gas has access around the entire periphery of core 2, despite the presence of the longitudinal joining members 33. The gas flows radially inward to the air gap 7, where the gas is picked up by the gap pick-up holes 8, circulated through the rotor and returned to the air gap through outlet holes 9 at an axially spaced location.

FIG. 3 of the drawing shows an outlet section. Gas flowing from the air gap 7 radially outward through ducts 22 enters the circumferentially extending ducts 37 in the inner frame. It flows circumferentially inside the inner frame wrapper 36 until it reaches outlets 39. As indicated in FIGS. 4 and 5, it then flows into the hot gas return manifolds 51 from the center towards opposite ends of the machine to the coolers 6, where it is again recirculated as before.

It is important to note that the cooperative relationship between the inner frame 3 and the outer frame 4 is not by means of alignment of circumferentially extending members and seals between inner and outer frames as in the prior art, but is by means of longitudinally extending members, including longitudinal plates 46 and longitudinal seals 47. Therefore, the rings and section plates in the outer frame can be located as desired without regard to the number of sections or locations of section plates in the inner frame.

It should also be noted that access around the entire periphery of the core at each of the inlet zones is afforded by means of the circumferentially extending ducts 37, even though the circumferentially extending ducts are interrupted by the longitudinal joining members 33. The manner in which this is accomplished may be seen by reference to FIGS. 2 and 3, wherein the longitudinal joining members are seen to be located such that the two cold gas manifolds have access to all three circumferentially extending ducts at top and bottom. In a similar manner, the two hot gas manifolds have access to all three circumferentially extending ducts at the sides of the machine. In practice, this is accomplished by insuring that there are at least as many manifolds as there are circumferentially extending arcuate sections, although in the embodiment shown there are four manifolds in the outer frame and three segments in the cage.

Various modifications will occur to those skilled in the art, for example, by varying the number of longitudinal dividers, any number or location of hot and cold gas manifolds could be provided. While there has been described herein what is considered to be the preferred embodiment of the invention, it is intended to cover in the appended claims all such modifications as fall within the true spirit and scope of the invention.

What is claimed is:

1. A dynamoelectric machine having a rotor and a stator defining an air gap therebetween and having means for recirculating cooling gas inside the machine, said stator comprising:

a cylindrical magnetic core defining a plurality of radial cooling ducts communicating with said air gap, an inner frame supporting said core and having axially spaced radial plates enclosed in part by circumferentially extending plates and defining, together with said core, a plurality of circumferentially extending ducts communicating with said radial ducts around the core periphery, and an outer frame supporting said inner frame and having circumferentially spaced longitudinal plates enclosed by outer wrapper plates and defining, together with said inner frame, a plurality of longitudinal manifolds, each of said manifolds communicating with alternate ones of said circumferentially extending ducts along the inner frame.

2. The combination according to claim 1, wherein said outer frame includes a plurality of longitudinal seals cooperating with the circumferentially extending plates of the inner frame to block communication between adjacent manifolds.

3. The combination according to claim 1, wherein there are four manifolds, two of said manifolds on diametrically opposite sides of the machine being supplied with cooling gas from opposite ends thereof and the two remaining manifolds, also disposed on diametrically opposite sides of the machine supplying hot gas toward the ends of the machine to be cooled and recirculated.

4. The combination according to claim 1 wherein said inner frame is divided into arcuate segments with means to join said segments together by longitudinal joining members, wherein the number of said manifolds is at least as great as the number of said segments.

5. The combination according to claim 1, wherein said inner frame is made in arcuate segments for joining along longitudinal joints and wherein said outer frame is made in annular sections for joining along circumferential joints.

6. The combination according to claim 1, wherein circumferential baffle means extending from the inner frame radial plates form close clearances with said core and wherein longitudinal sealing means extending from said longitudinal plates in the outer frame form close clearances with the inner frame periphery.

7. The combination according to claim 1, wherein said circumferentially extending plates in the inner frame define a series of openings in alternate circumferentially extending ducts, one series of said openings being disposed in a line along the length of the machine under one of said manifolds, another series of said openings being disposed in a line along the length of said machine inside an adjacent one of said manifolds.

References Cited

UNITED STATES PATENTS

| | | | |
|---|---|---|---|
| 1,869,503 | 10/1928 | Savage | 310—258 |
| 2,078,164 | 4/1937 | Savage | 310—55 |
| 2,554,226 | 5/1951 | Taylor | 310—258 |
| 2,650,994 | 9/1953 | Bahn | 310—57 |
| 2,707,242 | 4/1955 | Baudry | 310—57 |
| 2,873,393 | 2/1959 | Baudry | 310—55 |
| 3,237,032 | 2/1966 | Vickers et al. | 310—55 X |

J. D. MILLER, Primary Examiner

D. F. DUGGAN, Assistant Examiner

U.S. Cl. X.R.

310—57